United States Patent
Nakaya (10) Patent No.: US 11,870,602 B2
(45) Date of Patent: Jan. 9, 2024

(54) IN-VEHICLE EQUIPMENT CONTROL DEVICE

(71) Applicant: Mazda Motor Corporation, Hiroshima (JP)

(72) Inventor: Yusuke Nakaya, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 577 days.

(21) Appl. No.: 17/160,390

(22) Filed: Jan. 28, 2021

(65) Prior Publication Data

US 2021/0273824 A1 Sep. 2, 2021

(30) Foreign Application Priority Data

Feb. 27, 2020 (JP) .................................. 2020-032213

(51) Int. Cl.
*H04L 12/40* (2006.01)
*H04L 67/12* (2022.01)

(52) U.S. Cl.
CPC ............. *H04L 12/40* (2013.01); *H04L 67/12* (2013.01); *H04L 2012/40215* (2013.01); *H04L 2012/40273* (2013.01)

(58) Field of Classification Search
CPC ..................... H04L 12/40; H04L 67/12; H04L 2012/40215; H04L 2012/40273; Y02P 90/02; G06F 9/4411; G05B 19/0428; G05B 2219/24024
See application file for complete search history.

(56) References Cited

U.S. PATENT DOCUMENTS

| | | | | |
|---|---|---|---|---|
| 10,427,692 | B2 * | 10/2019 | Addison | G05D 1/0231 |
| 2010/0291920 | A1 * | 11/2010 | Lerzer | H04L 12/2854 455/552.1 |
| 2011/0078694 | A1 * | 3/2011 | Kishita | G06F 9/4881 718/103 |
| 2012/0159436 | A1 | 6/2012 | Morgan et al. | |

FOREIGN PATENT DOCUMENTS

JP 2012-133786 A 7/2012

OTHER PUBLICATIONS

CN 103684963 A with English translation. Published Mar. 26, 2014. (Year: 2014).*

* cited by examiner

*Primary Examiner* — Calvin Cheung
(74) *Attorney, Agent, or Firm* — XSENSUS LLP (57) ABSTRACT

To reduce the man-hours of software development when vehicle types are deployed an in-vehicle equipment control device includes a CPU and a memory. The CPU has an application layer, a middleware layer, and a device driver unit as software components. First communication packets on the application side and second communication packets on the device driver side are implemented in the middleware layer. The memory stores an internal mapping table that defines the connection relationships between the first communication packets and the second communication packets and an external mapping table that defines the direct communication routes between the first communication packets or the second communication packets and an in-vehicle network.

18 Claims, 4 Drawing Sheets

IN-VEHICLE EQUIPMENT CONTROL DEVICE

CROSS-REFERENCE TO RELATED APPLICATION

This application claims priority from Japanese Application No. 2020-032213, filed on Feb. 27, 2020, the contents of which are incorporated by reference herein in its entirety.

TECHNICAL FIELD

The technology disclosed herein relates to a technical field concerning in-vehicle equipment control devices.

BACKGROUND

In recent years, autonomous driving systems have been developed nationally and almost all actuators installed in vehicles have been electronically controlled. Control devices that control these actuators often have a software configuration compliant with the AUTOSAR (automotive open system architecture) standard.

For example, patent document 1 discloses a method that concerns an AUTOSAR software system having a plurality of AUTOSAR software elements connected via a runtime environment of and bypasses the AUTOSAR software elements.

PATENT DOCUMENTS

[Patent document 1] JP-A-2012-133786

SUMMARY

Problem to be Solved

By the way, in a hierarchical software architecture such as AUTOSAR, an application calls an API (application programming interface) provided by a device driver for each peripheral and exchanges data with individual I/Os.

Here, a case is assumed in which, for example, a certain ECU (referred to as a first ECU) transfers the transfer data obtained from in-vehicle equipment via an I/O, to another ECU (referred to as a second ECU) in an in-vehicle network. Previously, in the first ECU, the transfer data obtained from the I/O is input to an application, the application performs conversion processing and the like of the transfer data according to the communication protocol, and the transfer data is transferred to the second ECU based on an instruction from the application.

In this case, the data transfer program for the second ECU needs to be built into a program of the application and a dedicated application needs to be prepared as in, for example, the technology of patent document 1. In addition, for example, when the port to which the device is connected changes or when the signal form of an I/O of the device or the mode of information to be exchanged changes, the source code of the application concerning an API call of the application needs to be changed, thereby increasing the man-hours of software development.

The technology disclosed herein addresses these points with an object of reducing the man-hours of software development.

To solve the above problems, according to the technology disclosed herein, there is provided an in-vehicle equipment control device including a control unit that controls in-vehicle equipment; and a storage unit, in which the control unit includes, as software components, an application layer in which an application for achieving individual functions of the in-vehicle equipment is implemented, a device driver that converts a command received from the application to a command for hardware, and a middleware layer in which one or a plurality of first communication packets through which data is exchanged with the application and a plurality of second communication packets through which data is exchanged with the device driver are implemented, in which the storage unit stores a rewritable internal mapping table that defines connection relationships between the first communication packets and the second communication packets and a rewritable external mapping table that defines direct communication routes between the first communication packets or the second communication packets and a communication network to be connected to the middleware layer, and, in which the middleware layer generates a communication route based on the internal mapping table and the external mapping table.

According to the aspect, when the data obtained by the in-vehicle equipment control device is used by in-vehicle equipment connected to a communication network connected to the middleware layer, the data can be exchanged without intervention of the application, so the processing speed of the in-vehicle equipment control device can be improved. Furthermore, an application does not need to be prepared or executed to change the destination of the obtained data obtained by the in-vehicle equipment. This can significantly reduce the man-hours of software development.

The present disclosure describes various advantages. For example, as described above, according to the technology disclosed herein, the processing speed of the in-vehicle equipment control device can be improved. In addition, the man-hours of software development can be significantly reduced.

DETAILED DESCRIPTION

An exemplary embodiment will be described in detail below with reference to the drawings.

(Vehicle Control System)

Figure 1:
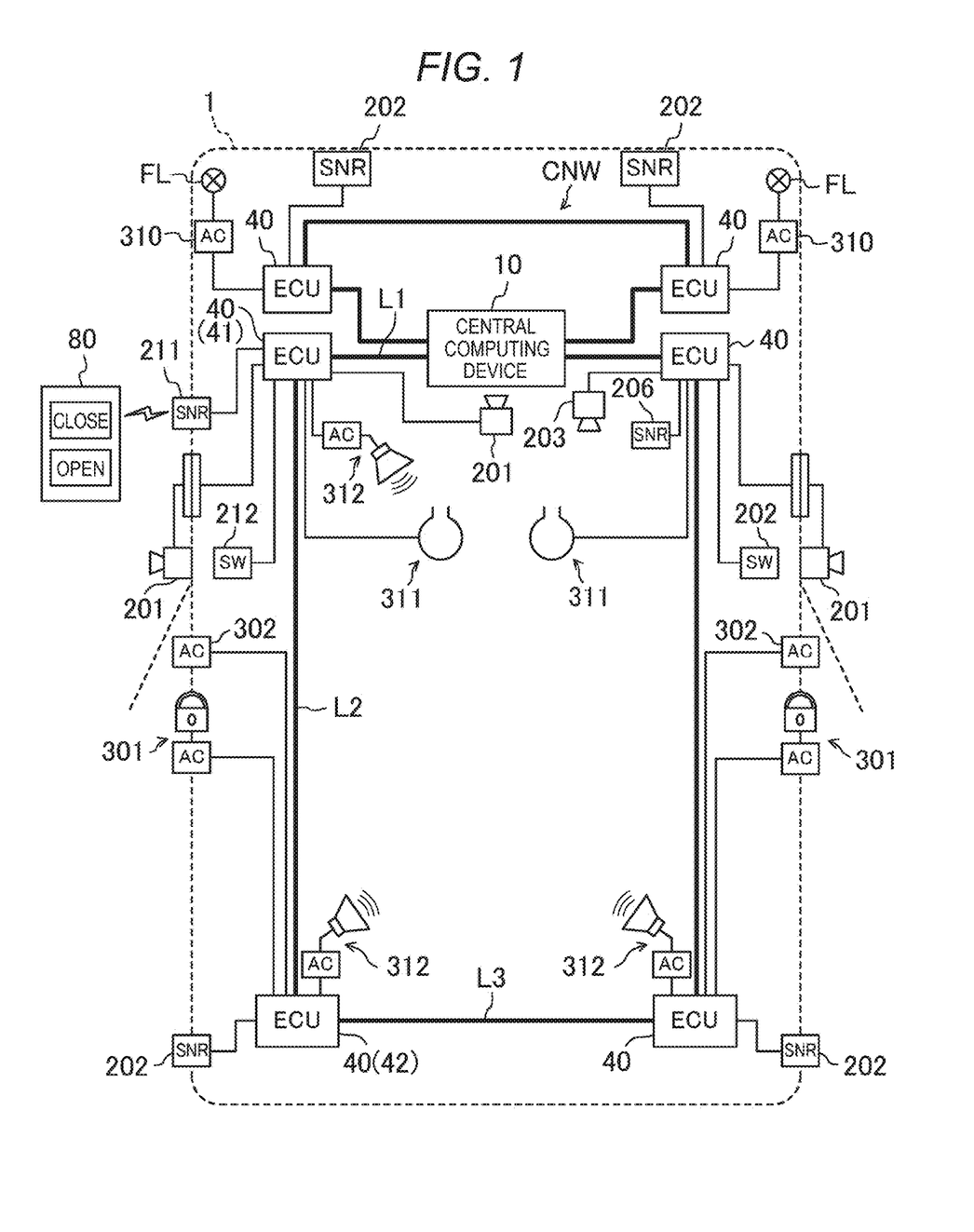
FIG. 1 is a diagram illustrating a structural example of a vehicle control system.

FIG. 1 is a diagram illustrating a structural example of a vehicle control system. The vehicle control system in FIG. 1 is installed in a vehicle 1 and includes a plurality of zone ECUs 40, each of which is disposed for each predetermined zone of the vehicle 1, and a central computing device 10 that centrally controls the plurality of zone ECUs 40. In the vehicle control system according to the embodiment, the vehicle 1 is divided into six zones and one zone ECU 40 is provided in each of the zones. The zone ECU is configured so that in-vehicle equipment can be connected thereto. In addition, the zone ECU 40 has a function as a network hub device that relays information sent via an in-vehicle network (referred to below as an in-vehicle network CNW). In the embodiment, it is assumed that the in-vehicle network CNW is a ring-shaped network compliant with the CAN protocol. The communication system of the in-vehicle network CNW is not particularly limited and the in-vehicle network CNW may be a network compliant with a communication protocol other than the CAN communication protocol (for example, the Ethernet (registered trademark) protocol).

In the following, for convenience of explanation, the zone ECU 40 disposed in the left front zone on the left front side of the vehicle 1 may be referred to as a first zone ECU 41 and the zone ECU 40 disposed in the left rear zone on the left rear side of the vehicle 1 may be referred to as the second zone ECU 42. In addition, the first zone ECU 41 and the second zone ECU 42 are connected to each other by a CAN bus L2.

<In-Vehicle Equipment>

The in-vehicle equipment 20 includes actuators 300 and input equipment having sensor devices 200 and signal receiving devices.

<Sensor Devices and Signal Receiving Devices>

The sensor devices 200 include, for example, (1) a plurality of cameras 201, provided on the body or the like of the vehicle 1, that capture the environment outside the vehicle, (2) a plurality of radars 202, provided on the body or the like of the vehicle 1, that detect targets and the like outside the vehicle, (3) a position sensor (not illustrated) that detects the position (vehicle position information) of the vehicle 1 using the GPS (Global Positioning System), (4) vehicle state sensors (not illustrated), including a vehicle speed sensor, an acceleration sensor, a yaw rate sensor, and the like for detecting the behavior of the vehicle, that obtain the state of the vehicle 1, (5) an occupant state sensor, including an in-vehicle camera 203 and the like, that obtains the state of occupant of the vehicle 1, (6) a driving operation sensor 206 that detects the driving operation of the driver, and (7) a sensor 211 (referred to below as a keyless sensor 211) that operates a keyless device. The driving operation sensor 206 includes, for example, an accelerator position sensor, a steering angle sensor, a brake hydraulic sensor, and the like. The keyless sensor 211 includes, for example, a receiving device that receives an unlocking-locking signal from a keyless remote controller 80 and a motion sensor that detects that the driver holding the key has approached the sensor or touched the doorknob. In addition, the sensor devices 200 include switches that detect operations by the occupant. The switches include, for example, a door open-close switch 212 for the occupant to open and close an electric door, a switch for operating an electric power window, a washer level switch, a hood switch, and the like.

The signal receiving devices include receiving devices that receive signals from, for example, external networks or other vehicles.

<Actuators>

The actuators 300 include a drive system actuator, a steering system actuator, a braking system actuator, and the like. Examples of the drive system actuator include an engine, a transmission, and a motor. An example of the braking system actuator is a brake. An example of the steering system actuator is a steering. In addition, the actuators 300 include, for example, a door lock device 301 that locks a side door, a door open-close device 302 that electrically opens and closes the door, a lighting control device 310 that controls the lighting of headlights FL, and an airbag device 311, and an acoustic device 312, and the like.

[In-Vehicle Equipment Control Device]

The in-vehicle equipment control devices 100 are installed in the one or more zone ECUs 40. That is, the in-vehicle equipment control devices 100 may be installed in all of the zone ECUs or a part of the zone ECUs. In addition, the in-vehicle equipment control device 100 may be installed in (1) the central computing device 10 or (2) a dedicated ECU (not illustrated), connected downstream of the zone ECU 40, that is provided exclusively for each of the actuators. An example of the dedicated ECU is an engine drive ECU that drives the engine. The central computing device 10 and each of the ECUs may include a single IC (integrated circuit) or a plurality of ICs.

Figure 2A:
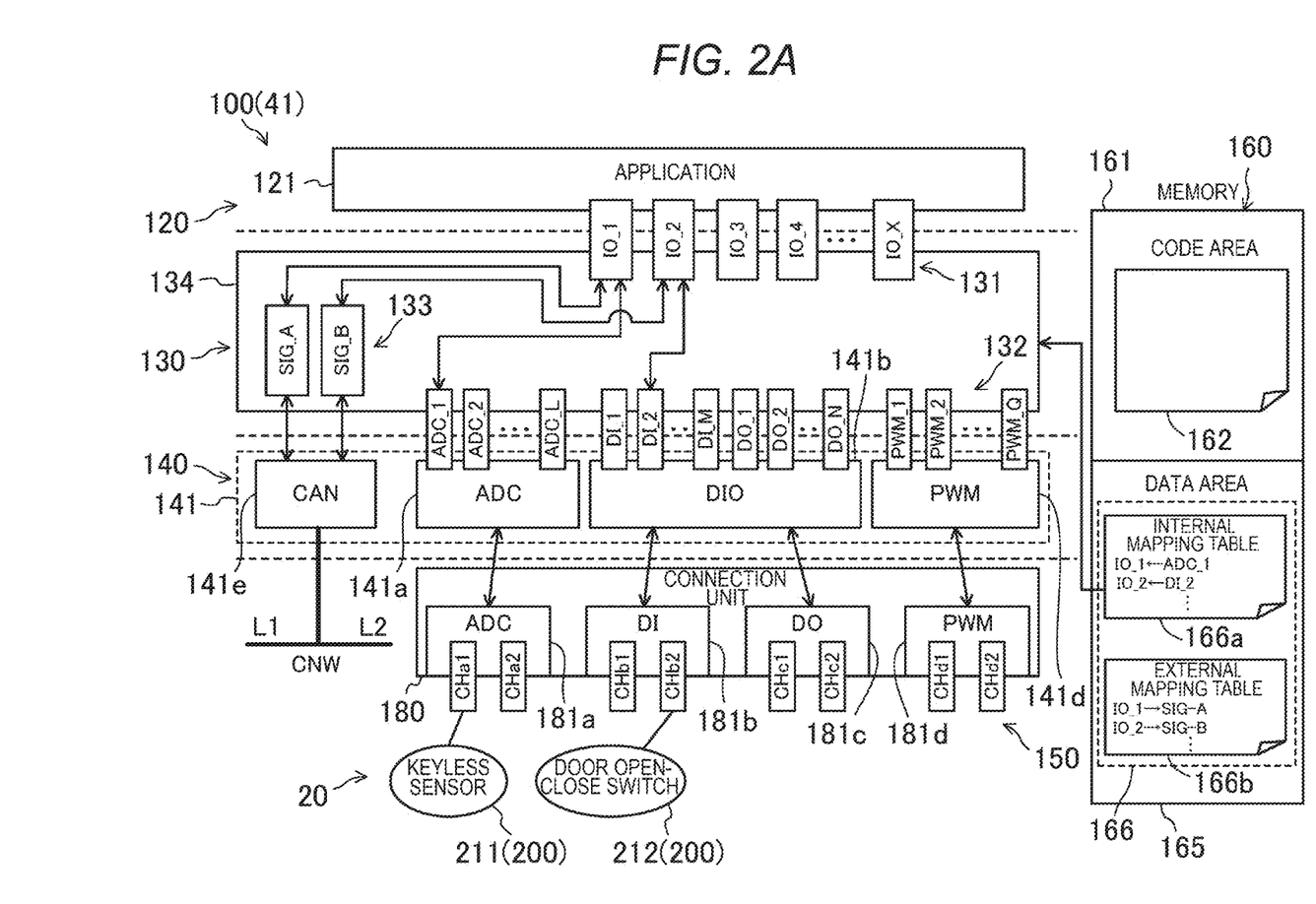
FIG. 2A is a diagram illustrating a structural example of an in-vehicle equipment control device according to an embodiment.
Figure 2B:
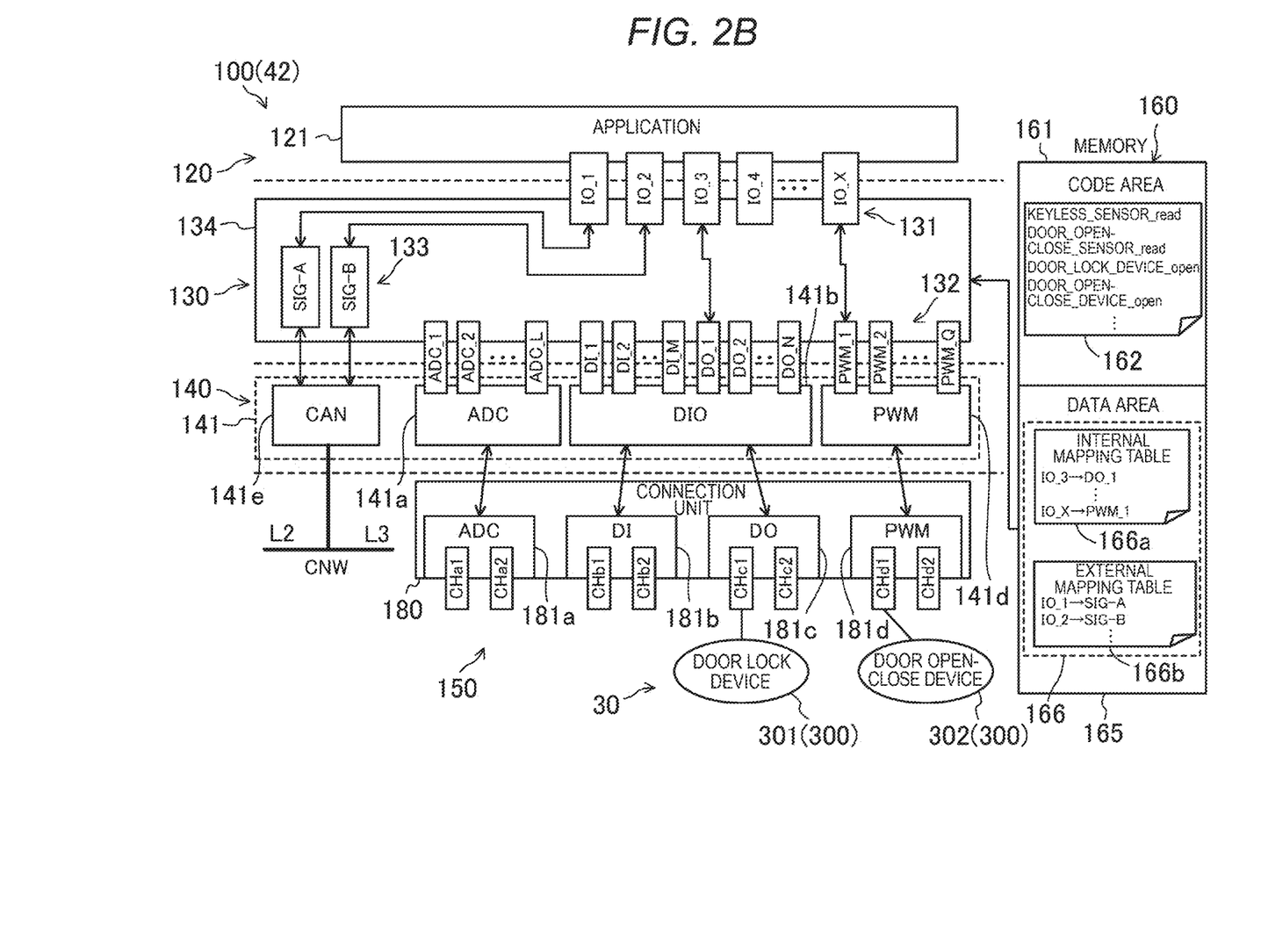
FIG. 2B is a diagram illustrating a structural example of the in-vehicle equipment control device according to the embodiment.

FIGS. 2A and 2B are block diagrams illustrating structural examples of the in-vehicle equipment control device 100. The in-vehicle equipment control device 100 includes, for example, a CPU 150 (processor) and a memory 160. In the embodiment, it is assumed that the in-vehicle equipment control device 100 in FIG. 2A is installed in the first zone ECU 41 and the in-vehicle equipment control device 100 in FIG. 2B is installed in the second zone ECU 42. In FIGS. 2A and 2B, the basic structures of the hardware and software of the in-vehicle equipment control device 100 are identical and the same components are denoted by the same reference numerals. In addition, the same components between FIGS. 2A and 2B may be collectively referred to as the components in FIG. 2 and descriptions of individual components may be omitted.

<CPU>

The CPU 150 performs various types of processing by reading programs 162 from the memory 160 and executing the programs 162. Specifically, the CPU 150 reads, for example, the detection data detected by the sensor devices 200, performs various types of arithmetic processing to achieve various functions, and generates and outputs control signals for controlling the actuators 300. The CPU 150 is an example of the control unit. The specific aspect of the CPU 150 is not particularly limited. For example, the CPU 150 may be achieved by a microcomputer or an SoC (system-on-chip).

<Hardware>

The CPU 150 includes, as hardware components, a calculation unit that performs various types of calculation processing according to programs stored in the memory 160 and a peripheral function unit 180. The peripheral here refers to the in-vehicle equipment 20 used in combination with the central computing device 10 and/or the zone ECUs 40.

The peripheral function unit 180 includes one or more peripheral function portions 181 for operating peripherals, that is, the in-vehicle equipment 20. As illustrated in FIG. 2, the peripheral function portions 181 include, for example, an analog-digital converter 181a (referred to below as an ADC 181a), a digital input unit 181b, a digital output unit 181c, and a PWM control unit 181d. It should be noted here that a part of the components 181a to 181d in FIG. 2 may be installed or other components may be included as the peripheral function portions 181. When the peripheral functions of the ADC 181a, the digital input unit 181b, the digital output unit 181c, and the PWM control unit 181d are not particularly distinguished in the following description, these units are simply indicated as the peripheral function portions 181.

Each of the peripheral function portions 181 has a plurality of channels. The channels are configured so that the input-output units (for example, the connectors for I/O connection) of the in-vehicle equipment 20 can be connected thereto. FIG. 2 illustrates an example in which, as the channels described above, input channels CHa1 and CHa2 are provided in the ADC 181a, input channels CHb1 and CHb2 are provided in the digital input unit 181b, output channels CHc1 and CHc2 are provided in the digital output unit 181c, and output channels CHd1 and CHd2 are provided in the PWM control unit 181d, respectively. The number of channels is not limited to two and may be three or more. In addition, the single peripheral function portion 181 may be provided with both input and output channels.

<Software>

The CPU 150 includes, as software components, a topmost application layer 120, a middleware layer 130 below the application layer, and a device driver layer 140 below the middleware layer 130. The CPU 150 may adopt a software configuration compliant with so-called AUTOSAR. In this case, the application layer 120 corresponds to the AUTOSAR application layer and includes, for example, one or more SWC (software component) modules. In addition, the middleware layer 130 and the device driver layer 140 correspond to BSW (basic software) and the device driver layer 140 corresponds to MCAL (microcontroller abstraction layer). The middleware layer 130 may be implemented as a complex driver.

An application 121 for achieving various functions for the in-vehicle equipment 20 is implemented in the application layer 120. The application 121A may have a well-known configuration. A specific example of the application 121 will be described later.

A device driver unit 141 that converts a command received from the application 121 to a command for hardware is implemented in the device driver layer 140.

Individual device drivers for the peripheral function portions 181 included in the peripheral function unit 180 are implemented in the device driver unit 141. As described above, in the example in FIG. 2, the ADC 181a, the digital input unit 181b, the digital output unit 181c, and the PWM control unit 181d are included as the peripheral function portions 181. Accordingly, the device driver unit 141 includes an ADC driver 141a, which is the device driver for the ADC 181a, a DIO driver 141b, which is the device driver for the digital input unit 181b and the digital output unit 181c, and a PWM driver 141d, which is the device driver for the PWM control unit 181d. That is, the ADC driver 141a is connected to the ADC 181a, the DIO driver 141b is connected to the digital input unit 181b and the digital output unit 181c, and the PWM driver 141d is connected to the PWM control unit 181d.

In addition, the device driver unit 141 includes a communication driver 141e for connecting to the in-vehicle network CNW. The communication driver 141e is compliant with the communication protocol of the in-vehicle network CNW. For example, when the in-vehicle network is compliant with the CAN (controller area network) protocol, a CAN driver is provided as the communication driver 141e. The communication protocol of the in-vehicle network to which the technology of the present disclosure can be applied is not limited to CAN and may be another communication protocol such as Ethernet.

The device driver is hardware-dependent software. Generally, hardware-independent software (such as, for example, an operating system) is also implemented in the device driver layer 140.

In the middleware layer 130, a mapping module 134 including one or more first communication packets 131 for exchanging data with the application 121, one or more second communication packets 132 for exchanging data with the device driver, and an external communication packet 133 for exchanging data with the in-vehicle network is implemented.

In the example in FIG. 2, IO_1, IO_2, ..., IO_X (X is a natural number) are implemented as the first communication packets 131. As the second communication packets 132, (1) ADC_1, ADC_2, ..., ADC_L (L is a natural number) for exchanging data with the ADC driver 141a, (2) DI_1, DI_2, ..., DI_M (M is a natural number) and DO_1, DO_2, ..., DO_N (N is a natural number) for exchanging data with the DIO driver 141b, and (3) PWM_1, PWM_2, ..., PWN_Q (Q is a natural number) for exchanging data with the PWM driver 141d are implemented. SIG_A and SIG_B are implemented as the external communication packets 133.

The external communication packet 133 has a packet structure suitable for the in-vehicle network CNW to transfer data to the in-vehicle network. For example, when the in-vehicle network CNW is CAN, the communication packets SIG_A and SIG_B can perform communication compliant with the CAN communication protocol with other zone ECUs 40 and central computing devices 10 via the communication driver 141e. More specifically, the data obtained from the sensor devices 200 is subjected to size adjustment processing and data treatment processing such as format conversion to create data frames in, for example, the "standard format" or the "extended format" of CAN communication and then stored in the communication packets SIG_A and SIG_B. For example, the size adjustment processing and the data treatment processing described above may be defined in a code area 161 or may be stored in a data area 165 in a rewritable format or the like.

In one aspect, the following connection relationships can be assumed in FIG. 2. The communication packet ADC_1 is connected to the channel CHa1 of the ADC 181a and the communication packet ADC_2 is connected to the channel CHa2 of ADC 181a. The communication packet DI_1 is connected to the channel CHb1 of the digital input unit 181b and the communication packet DI_2 is connected to the channel CHb2 of the digital input unit 181b. The communication packet DO_1 is connected to the channel CHc1 of the digital output unit 181c and the communication packet DO_2 is connected to the channel CHc2 of the digital output unit 181c. The communication packet PWM_1 is connected to the channel CHd1 of the PWM control unit 181d and the communication packet PWM_2 is connected to the channel CHd2 of the PWM control unit 181d.

The mapping module 134 generates a communication route between the application layer 120 and the device driver based on an internal mapping table 166a stored in the memory 160. The mapping module 134 also generates communication routes between the first communication packets 131 or the second communication packets 132 and the external communication packet 133 based on an external mapping table 166b. Examples of generating individual communication routes will be described later.

A runtime environment (RTE) may be implemented between the application layer 120 and the mapping module 134 in the middleware layer 130. The runtime environment is configured so that the application 121 and the software implemented in the device driver layer 140 are connected after undergoing abstraction.

<Memory>

The memory 160 includes, as storage areas, the code area 161 in which the program 162 for operating the CPU 150 is stored and a rewritable data area 165 in which the processing result of the CPU 150 and the data of the mapping table 166 and the like are stored.

<Code Area>

In the code area, for example, the program 162 created in advance at the design stage of the in-vehicle equipment control device 100 is compiled and implemented. For example, in the case in FIG. 2A, the code area 161 of the first zone ECU 41 stores the program 162 for operating the application 121 in the first zone ECU 41. For example, in the case in FIG. 2B, the code area 161 of the second zone ECU 42 stores the program 162 for operating the application 121 in the second zone ECU 42.

In the embodiment, the first zone ECU 41 does not use the outputs of the keyless sensor 211 and the door open-close switch 212. Accordingly, it is assumed that the code area 161 of the first zone ECU 41 does not include the processing related to the control of the actuators 300 that is based on the keyless sensor 211 and the door open-close switch 212. This is also true of the case in FIG. 3 described later. On the other hand, it is assumed that the second zone ECU 42 controls the left-side door using the detection result in the first zone ECU 41. Accordingly, the code area 161 of the second zone ECU 42 stores the program that obtains the input data of the detection result of the keyless sensor 211 and the operation result of the door open-close switch 212 and the control program for the door lock device 301 and the door open-close device 302 that is based on the input data.

<Data Area>

As described above, the data area 165 stores the mapping table 166. The mapping table 166 includes the internal mapping table 166*a* and the external mapping table 166*b*. Although the internal mapping table 166*a* and the external mapping table 166*b* are defined separately for convenience of understanding, these mapping tables 166*a* and 166*b* do not need to be clearly separated as data or data areas. For example, the internal mapping table 166*a* and the external mapping table 166*b* may be disposed in a mixed manner or disposed in a combined manner in the data area 165. In addition, a single unit of data (for example, a single program code) may include information of both the internal mapping table 166*a* and the external mapping table 166*b*.

The internal mapping table 166*a* is a table that defines the connection relationship between the first communication packets 131 and the second communication packets 132. More specifically, for example, when there is the plurality of first communication packets 131 and the plurality of second communication packets 132, the communication packets that are the connection targets of the first and second communication packets are defined. In the case in FIG. 2A, it is defined that the connection target of the communication packet IO_1 is the communication packet ADC_1 and the connection target of the communication packet IO_2 is the communication packet DI_2. In the case in FIG. 2B, it is defined that the connection target of the communication packet IO_3 is the communication packet DO_1 and the connection target of the communication packet IO_X is communication packet PWM_1. It should be noted here that either the first communication packets 131 or the second communication packets 132 may be a single packet.

The external mapping table 166*b* is a table that defines the direct communication routes between the first communication packets 131 or the second communication packets 132 and the in-vehicle network CNW. More specifically, the communication routes between the first communication packets 131 or the second communication packets 132 and the external communication packets 133 are defined. In the case in FIG. 2A, it is defined that the connection target of the communication packet IO_1 is the communication packet SIG_A and the connection target of the communication packet IO_2 is the communication packet SIG_B. In the case in FIG. 2B, it is defined that the connection target of the communication packet IO_1 is the communication packet SIG_A and the connection target of the communication packet IO_2 is the communication packet SIG_B.

[Operation Example of In-Vehicle Equipment Control Device]

Next, an example of the operation of the in-vehicle equipment control device 100 will be described with reference to FIGS. 2A and 2B. As described above, it is assumed that the in-vehicle equipment control device 100 in FIG. 2A is installed in the first zone ECU 41 and the in-vehicle equipment control device 100 in FIG. 2B is installed in the second zone ECU 42. In addition, the communication packets SIG_A and SIG_B of the first zone ECU 41 and the second zone ECU 42 are configured so that communication packets can be sent to and received from the corresponding communication packets SIG_A and SIG_B installed in the counterpart ECUs via the in-vehicle network CNW between the first zone ECU 41 and the second zone ECU 42. Well-known technology can be applied to bidirectional communication (transmission and reception of data therebetween) between the communication packets SIG_A and SIG_B. Specifically, for example, when the in-vehicle network is CAN communication, a communication packet is periodically sent regardless of the presence or absence of data or a communication packet is sent in response to a predetermined trigger. The communication packets SIG_A and SIG_B described above can support both of them and have the structure that supports such packet communication.

The sensor devices 200 and the actuators 300 disposed mainly in the left front zone of the vehicle 1 are connected to the first zone ECU 41. In the example in FIG. 1, the camera 201 that takes an image on the left side of the vehicle, the keyless sensor 211, and the door open-close switch 212 are connected to the first zone ECU 41. As illustrated in FIG. 2A, the keyless sensor 211 is connected to the channel CHa1 of the ADC 181*a* and the door open-close switch 212 is connected to the channel CHa2 of the digital input unit 181*b*. The camera 201 is not illustrated in FIG. 2A.

The sensor devices 200 and the actuators 300 disposed mainly in the left rear zone of the vehicle 1 are connected to the second zone ECU 42. In the example in FIG. 1, the radar 202 for detecting obstacles on the left side behind the vehicle, the door lock device 301 for locking the left-side door, the door open-close device 302 for automatically opening and closing the left-side door, and the acoustic device 312 are connected to the second zone ECU 42. As illustrated in FIG. 2B, the door lock device 301 is connected to the channel CHc1 of the digital output unit 181*c*, and the door open-close device 302 is connected to the channel CHd1 of the PWM control unit 181*d*.

First, the read processing of the keyless sensor 211 in the first zone ECU 41 in FIG. 2A will be described. When the detection signal from the keyless sensor 211 is received through the channel CHa1, the detection signal is sent to the mapping module 134 as communication packet ADC_1 via ADC driver 141*a*. In the mapping module 134, the internal mapping table 166*a* is first applied and the communication packet ADC_1 is sent to the communication packet IO_1. Next, the external mapping table 166*b* is applied and the communication packet IO_1 is sent to communication packet SIG_A. As described above, the communication packet SIG_A of the first zone ECU 41 sends data to the communication packet SIG_A of the second zone ECU 42 via the communication driver 141e.

Next, the read processing of the door open-close switch 212 in the first zone ECU 41 in FIG. 2A will be described. When the detection signal from the door open-close switch 212 is received through the channel CHb2, the detection signal is sent to the mapping module 134 as the communication packet DI_2 via the DIO driver 141b. In the mapping module 134, the internal mapping table 166a is first applied and the communication packet DI_2 is sent to the communication packet IO_2. Next, the external mapping table 166b is applied and the communication packet IO_2 is sent to the communication packet SIG_B. As described above, the communication packet SIG_B of the first zone ECU 41 sends data to the communication packet SIG_B of the second zone ECU 42 via the communication driver 141e.

In this way, the detection signal of the keyless sensor 211 and the detection signal of the door open-close switch 212 are sent to the second zone ECU 42 without intervention of the application 121 of the first zone ECU 41.

When the detection signal of the keyless sensor 211 is received from the first zone ECU 41 in the second zone ECU in FIG. 2B, the received signal is stored in the communication packet SIG_A via the communication driver 141e. In the mapping module 134, the external mapping table 166b is first applied and the communication packet SIG_A is sent to the communication packet IO_1. The communication packet IO_1 is read by the application 121. The application 121 of the second zone ECU 42 packetizes an instruction regarding the locking-unlocking processing of the door lock device 301 based on the detection signal of the keyless sensor 211 received from the first zone ECU 41, and sends this instruction to the mapping module 134 as the communication packet IO_3. In the mapping module 134, the internal mapping table 166a is applied. As described above, the communication packet IO_3 is connected to the communication packet DO_1 in the internal mapping table 166a. This causes the DIO driver 141b to operate based on the instruction of the application 121 and locks or unlocks the door lock device 301.

Similarly, when the detection signal of the door open-close switch 212 is received from the first zone ECU 41 in the second zone ECU 42 in the FIG. 2B, the received signal is stored in the communication packet SIG_B via the communication driver 141e. In the mapping module 134, the external mapping table 166b is first applied and the communication packet SIG_B is sent to the communication packet IO_2. The communication packet IO_2 is read by the application 121. The application 121 of the second zone ECU packetizes an instruction regarding the open-close processing of the left-side door based on the detection signal of the open-close switch 212 received from the first zone ECU 41 and sends this instruction to the mapping module 134 as the communication packet IO 4. In the mapping module 134, the internal mapping table 166a is applied. As described above, in the internal mapping table 166a, the communication packet IO 4 is connected to the communication packet PWM_1. This causes the PWM driver 141d to operate based on the instruction of the application 121, drives the door open-close device 302, and performs the open-close control of the left-side door. Although the communication packet SIG_B is sent to the communication packet IO_2 and read by application 121 in the embodiment described above, the present disclosure is not limited to this example. For example, the mapping module 134 may send the communication packet SIG_B to the communication packet PWM_1 without intervention of the application 121 and may send the communication packet SIG_B from the communication packet PWM_1 to the PWM driver 141d. When processing is performed without intervention of the application 121 as described above, the application layer 120 may be eliminated from the zone ECU 40. In this case, the first communication packets 131 may be eliminated, a mapping table that connects the external communication packet 133 and the second communication packets 132 may be prepared, and routing may be performed based on this mapping table.

[Example of Comparison]

Figure 3:
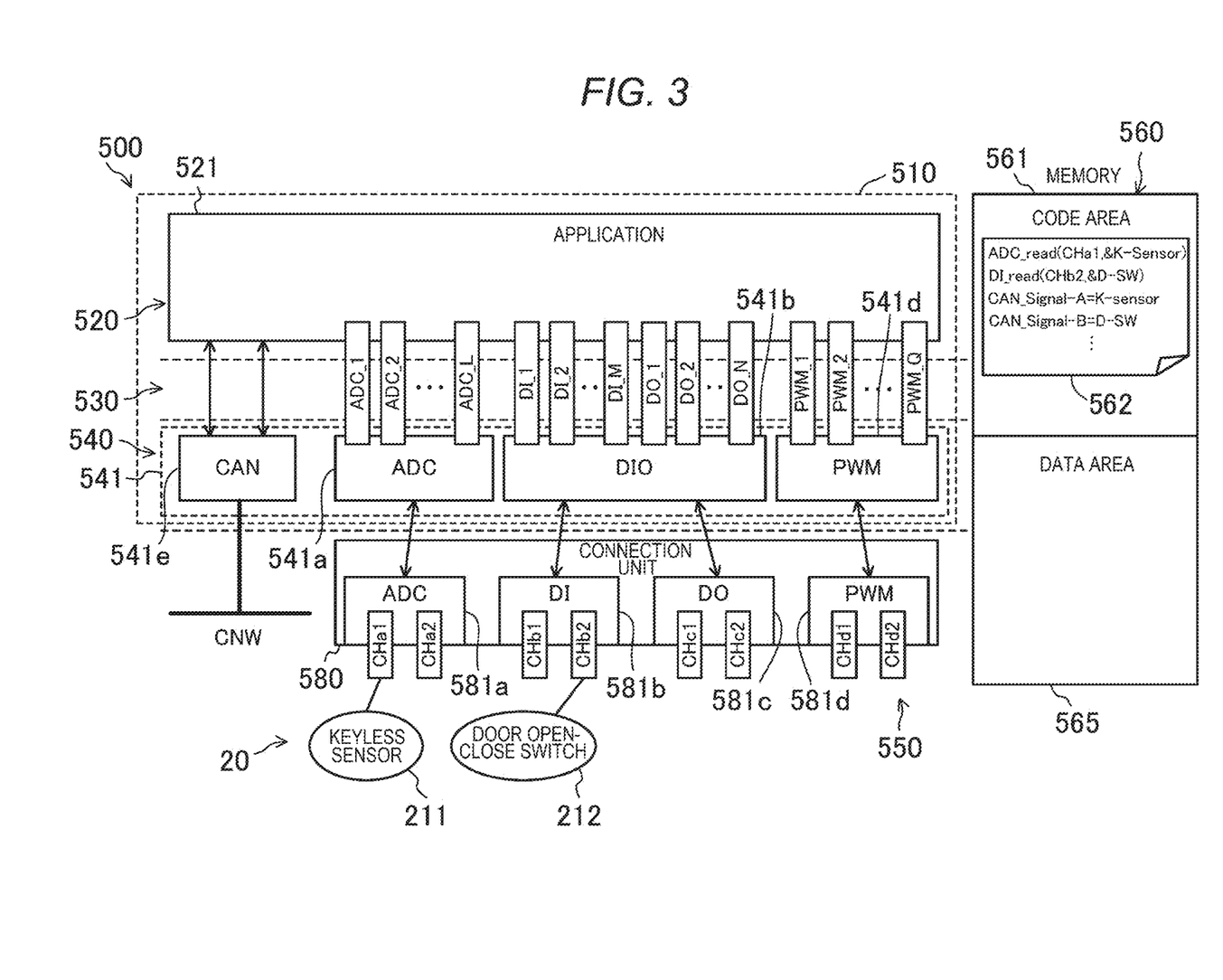
FIG. 3 is a diagram illustrating a structural example of an in-vehicle equipment control device according to a comparative example.

FIG. 3 illustrates an example of comparison with the structure in FIG. 2A. It should be noted here that components that are the same between FIG. 2A and FIG. 3 have the same last two digits or the same last two digits followed by the same subsequent sign. For example, an in-vehicle equipment control device 500 corresponds to the in-vehicle equipment control device 100.

In FIG. 3, a single communication packet is implemented as a middleware layer 530. In addition, the application 121 is directly connected to a communication driver 541e for CAN communication. The other components are the same as in FIG. 2A.

Specifically, in a program 562 in FIG. 3, the processing content for operating a CPU 550 is implemented in a code area 561. In the program 562, the connection destination channel in the peripheral function portion 181 is also set for the communication packet in the middleware layer 530 that sends the processing content. Such a structure can achieve the same operation as the embodiment described above.

On the other hand, in the structure in FIG. 3, the detection signal of the keyless sensor 211 input from the channel CHa1 to an ADC 581a is input to an application 521 via an ADC driver 541a and the communication packet ADC_1. Then, the detection signal of the keyless sensor 211 is output via the communication driver 541e from the application 521 to the in-vehicle network CNW. Similarly, the detection signal of the door open-close switch 212 input through the channel CHb2 to a digital input unit 581b is input to the application 521 via a DIO driver 541b and the communication packet DI_2, and the detection signal of the door open-close switch 212 is output from the application 521 to the in-vehicle network CNW via the communication driver 541e.

As described above, in the in-vehicle equipment control device 100 according to the embodiment, the CPU 150 has the application layer 120, the middleware layer 130, and the device driver unit 141 as software components. The first communication packets 131 that exchange data with the application and the second communication packets 132 that exchange data with the device driver are implemented in the middleware layer 130. Then, the memory 160 stores the rewritable internal mapping table 166a that defines the connection relationship between the first communication packets 131 and the second communication packets 132, and the rewritable external mapping table 166b that defines the direct communication routes between the first communication packets 131 or the second communication packets 132 and the in-vehicle network CNW to be connected to the middleware layer 130. In the middleware layer 130, based on the internal mapping table 166a and the external mapping table 166b, the communication routes between the communication packets and the in-vehicle network CNW are generated in a closed form within the middleware layer 130 without intervention of the application 121.

As a result, when, for example, the data obtained by the in-vehicle equipment 20 (for example, the sensor devices 200) connected to the first zone ECU 41 is used by another zone ECU 40 (for example, the second zone ECU 42) connected via the in-vehicle network CNW, the first zone ECU 41 can send the data to the in-vehicle network CNW without any treatment by the program codes of the application 121. In addition, when the obtained data obtained in the zone ECU 40 is used in another zone ECU 40 connected via the in-vehicle network CNW as described above, the application 121 does not need to be prepared or executed to change the destination of the obtained data. This can simplify the design process and the verification process of software and significantly reduce the man-hours of software development. In addition, since data can be exchanged between zone ECUs 40 without intervention of the application 121, the processing speed of the in-vehicle equipment control device 100 can be improved.

The technology disclosed herein is not limited to the embodiment described above and can be applied to another embodiment without departing from the spirit of the claims. In addition, the embodiment described above is only an example and the scope of the present disclosure should not be understood in a limited manner. The scope of the present disclosure is defined by the claims and all modifications and changes belonging to the equivalent scope of the claims fall within the scope of the present disclosure.

For example, the external mapping table 166b defines the connection relationship between the external communication packet 133 and the first communication packets 131 in the embodiment described above, but the present disclosure is not limited to this example. For example, the external mapping table 166b may define the connection relationships between the components of the external communication packet 133 and the components of the second communication packets 132. In addition, the external mapping table 166b may define both the connection relationships between the components of the external communication packet 133 and the components of the first communication packets 131 and the connection relationships between the components of the external communication packet 133 and the components of the second communication packets 132.

INDUSTRIAL APPLICABILITY

The technology disclosed herein is useful in designing in-vehicle equipment control devices.

What is claimed is:

1. An in-vehicle equipment control device, comprising:
circuitry configured to control in-vehicle equipment; and
a memory,
wherein the circuitry includes, as software components,
an application layer in which an application for achieving individual functions of the in-vehicle equipment are implemented,
a device driver configured to convert a command received from the application to a command for hardware, and
a middleware layer in which one or a plurality of first communication packets through which data is exchanged with the application and a plurality of second communication packets through which data is exchanged with the device driver are implemented,
wherein the memory stores a rewritable internal mapping table that defines connection relationships between the first communication packets and the second communication packets and a rewritable external mapping table that defines direct communication routes between the first communication packets or the second communication packets and a communication network to be connected to the middleware layer, and
wherein the middleware layer generates a communication route based on the internal mapping table and the external mapping table.

2. The in-vehicle equipment control device of claim 1, further comprising:
a keyless sensor disposed in a first portion of a vehicle, wherein the keyless sensor is communicably coupled to a first zone electronic control unit (ECU), and
one or more sensor devices and one or more actuators disposed in a second portion of the vehicle, wherein the one or more sensor devices and the one or more actuators are communicably coupled to a second zone ECU.

3. The in-vehicle equipment control device of claim 1, further comprising:
a door open-close switch disposed in a first portion of a vehicle, wherein the door open-close switch is communicably coupled to a first zone ECU, and
one or more sensor devices and one or more actuators disposed in a second portion of the vehicle, wherein the one or more sensor devices and the one or more actuators are communicably coupled to a second zone ECU,
wherein a detection signal of the door open-close switch is transmitted to the second zone ECU without intervention of the application of the first zone ECU.

4. The in-vehicle equipment control device of claim 3, wherein the circuitry is further configured to
receive the detection signal from the door open-close switch, and
transmit the detection signal to a mapping module.

5. The in-vehicle equipment control device of claim 4, wherein the circuitry is further configured to
apply an internal mapping table.

6. The in-vehicle equipment control device of claim 5, wherein the circuitry is further configured to
apply an external mapping table.

7. The in-vehicle equipment control device of claim 6, wherein a communication packet of the first zone ECU sends data to a communication packet of the second zone ECU.

8. The in-vehicle equipment control device of claim 3, wherein the first portion of the vehicle is a left front zone of the vehicle.

9. The in-vehicle equipment control device of claim 3, wherein the second portion of the vehicle is a left rear zone of the vehicle.

10. A vehicle, comprising:
an in-vehicle equipment control device, wherein the in-vehicle equipment control device includes
circuitry configured to control in-vehicle equipment in the vehicle, and
a memory,
wherein the circuitry includes, as software components,
an application layer in which an application for achieving individual functions of the in-vehicle equipment are implemented,
a device driver configured to convert a command received from the application to a command for hardware, and
a middleware layer in which one or a plurality of first communication packets through which data is exchanged with the application and a plurality of second communication packets through which data is exchanged with the device driver are implemented, wherein the memory stores a rewritable internal mapping table that defines connection relationships between the first communication packets and the second communication packets and a rewritable external mapping table that defines direct communication routes between the first communication packets or the second communication packets and a communication network to be connected to the middleware layer, and wherein the middleware layer generates a communication route based on the internal mapping table and the external mapping table.

11. The vehicle of claim 10, wherein the in-vehicle equipment control device further comprises:

a keyless sensor disposed in a first portion of the vehicle, wherein the keyless sensor is communicably coupled to a first zone electronic control unit (ECU), and one or more sensor devices and one or more actuators disposed in a second portion of the vehicle, wherein the one or more sensor devices and the one or more actuators are communicably coupled to a second zone ECU.

12. The vehicle of claim 10, wherein the in-vehicle equipment control device further comprises:

a door open-close switch disposed in a first portion of a vehicle, wherein the door open-close switch is communicably coupled to a first zone ECU, and one or more sensor devices and one or more actuators disposed in a second portion of the vehicle, wherein the one or more sensor devices and the one or more actuators are communicably coupled to a second zone ECU, wherein a detection signal of the door open-close switch is transmitted to the second zone ECU without intervention of the application of the first zone ECU.

13. The vehicle of claim 12, wherein the circuitry is further configured to receive the detection signal from the door open-close switch, and transmit the detection signal to a mapping module.

14. The vehicle of claim 13, wherein the circuitry is further configured to apply an internal mapping table.

15. The vehicle of claim 14, wherein the circuitry is further configured to apply an external mapping table.

16. The vehicle of claim 15, wherein a communication packet of the first zone ECU sends data to a communication packet of the second zone ECU.

17. The vehicle of claim 12, wherein the first portion of the vehicle is a left front zone of the vehicle.

18. The vehicle of claim 12, wherein the second portion of the vehicle is a left rear zone of the vehicle.

* * * * *